(12) United States Patent
Varga

(10) Patent No.: US 8,272,537 B2
(45) Date of Patent: Sep. 25, 2012

(54) VALVELESS LIQUID DISPENSER

(75) Inventor: Leslie J. Varga, Cumming, GA (US)

(73) Assignee: Nordson Corporation, Westlake, OH (US)

( * ) Notice: Subject to any disclaimer, the term of this patent is extended or adjusted under 35 U.S.C. 154(b) by 552 days.

(21) Appl. No.: 12/418,861

(22) Filed: Apr. 6, 2009

(65) Prior Publication Data
US 2009/0261121 A1 Oct. 22, 2009

Related U.S. Application Data

(60) Provisional application No. 61/045,763, filed on Apr. 17, 2008.

(51) Int. Cl.
*B67D 7/82* (2010.01)
(52) U.S. Cl. .......... 222/146.5; 222/410; 222/325; 222/1; 141/11; 141/82
(58) Field of Classification Search .............. 222/146.5, 222/394, 327, 389, 411, 325, 207, 82, 146.2, 222/410, 590, 593, 1; 141/11, 82, 352
See application file for complete search history.

(56) References Cited

U.S. PATENT DOCUMENTS

| | | | | |
|---|---|---|---|---|
| 3,851,801 A | * | 12/1974 | Roth | 222/146.5 |
| 4,641,764 A | * | 2/1987 | Faulkner, III | 222/146.2 |
| 4,724,983 A | * | 2/1988 | Claassen | 219/421 |
| 4,771,920 A | * | 9/1988 | Boccagno et al. | 222/146.5 |
| 4,811,863 A | | 3/1989 | Claassen | |
| 4,846,373 A | | 7/1989 | Penn et al. | |
| 4,878,981 A | * | 11/1989 | Mizutani | 156/356 |
| 5,074,443 A | | 12/1991 | Fujii et al. | |
| 5,318,207 A | | 6/1994 | Porter et al. | |
| 5,435,462 A | | 7/1995 | Fujii | |
| 5,458,275 A | | 10/1995 | Centea et al. | |
| 5,467,899 A | | 11/1995 | Miller | |
| 5,566,860 A | | 10/1996 | Schiltz et al. | |
| 5,657,904 A | * | 8/1997 | Frates et al. | 222/146.5 |

(Continued)

FOREIGN PATENT DOCUMENTS
WO 03/051526 A1 6/2003

OTHER PUBLICATIONS

Graco, Dispensit(R) Model 1053 MicroMelt Programmable Precision Metering Valve, Brochure, 2006.

(Continued)

*Primary Examiner* — Kevin P Shaver
*Assistant Examiner* — Robert Nichols, II
(74) *Attorney, Agent, or Firm* — Wood, Herron & Evans, L.L.P.

(57) ABSTRACT

An apparatus includes a valveless cartridge assembly that has a housing with an opening at a proximal end and an outlet port for dispensing the liquid at a distal end, with the opening being configured to accept a cartridge of the liquid therethrough and communicating with an interior space of the housing. A metered dispensing device is coupled to the valveless cartridge assembly and includes a positive displacement pump in fluid communication with the interior space and the outlet port for selectively dispensing the liquid through the outlet port. The apparatus may be such that at least a portion of the metered dispensing device is disposed within the housing or it may alternatively be coupled to an exterior of the housing. The positive displacement pump may be a gear pump.

18 Claims, 4 Drawing Sheets

U.S. PATENT DOCUMENTS

| | | | |
|---|---|---|---|
| 5,733,597 A | | 3/1998 | Schmitkons et al. |
| 5,836,482 A | * | 11/1998 | Ophardt et al. ............... 222/325 |
| 5,906,682 A | | 5/1999 | Bouras et al. |
| 5,944,226 A | | 8/1999 | Schiltz et al. |
| 5,984,147 A | | 11/1999 | Van Ngo |
| 6,036,106 A | * | 3/2000 | Peet ............................ 239/135 |
| 6,105,822 A | | 8/2000 | Larsen et al. |
| 6,131,770 A | | 10/2000 | Allen |
| 6,234,358 B1 | | 5/2001 | Romine et al. |
| 6,234,359 B1 | | 5/2001 | Brown et al. |
| 6,299,023 B1 | | 10/2001 | Arnone |
| 6,308,868 B1 | | 10/2001 | Hoffman et al. |
| 6,311,868 B1 | | 11/2001 | Krietemeier et al. |
| 6,422,427 B2 | | 7/2002 | Brown et al. |
| 6,607,104 B2 | | 8/2003 | McGuffey |
| 6,651,849 B2 | * | 11/2003 | Schroeder et al. ......... 222/129.1 |
| 6,957,751 B2 | * | 10/2005 | Ophardt ....................... 222/188 |
| 7,237,578 B2 | | 7/2007 | Porter et al. |
| 7,296,707 B2 | | 11/2007 | Raines et al. |
| 7,331,482 B1 | * | 2/2008 | Fugere ............................ 222/1 |
| 7,441,568 B2 | | 10/2008 | Porter et al. |
| 7,762,088 B2 | * | 7/2010 | Fiske et al. ..................... 62/3.64 |
| 2006/0016510 A1 | * | 1/2006 | Porter et al. ....................... 141/2 |
| 2006/0193969 A1 | | 8/2006 | Prentice et al. |
| 2008/0302477 A1 | * | 12/2008 | Varga et al. ................. 156/304.1 |

OTHER PUBLICATIONS

Graco/Liquid Control, Dispensit(R) Model 1053 MicroMelt Programmable Precision Metering Valve, brochure, 2006, 2 pgs.

Liquid Control, Dispensit(R) Model 1053, Rod Positive Displacement Dispense Valve, Brochure, 2003, 2 pgs.

Liquid Control, Dispensit(R) Model 1053, http://www.liquidcontrol.com/products/dispensit1053.aspx, Nov. 29, 2005, 2 pgs.

Liquid Control, Press Room, http://www.liquidcontrol.com/pressroom/pressrelease.aspx, Aug. 4, 2004, 2 pgs.

Liquid Control, Dispensit(R), Model 1053 MicroMelt, http://www.liquidcontrol.com/products/dispensit1053MicroMelt.aspx, Dec. 21, 2005, 2 pgs.

* cited by examiner

VALVELESS LIQUID DISPENSER

CROSS-REFERENCE TO RELATED APPLICATIONS

This application claims the benefit of U.S. Provisional Application No. 61/045,763, filed Apr. 17, 2008, the disclosure of which is hereby incorporated by reference herein in its entirety.

TECHNICAL FIELD

This invention generally relates to dispensing liquids, such as adhesives, and especially to dispensing hot melt adhesives such as reactive hot melt adhesives.

BACKGROUND

Hot melt adhesives are used in a wide variety of applications. In certain applications, relatively high bond strengths are required and polyurethane reactive (PUR) hot melt adhesives have been used due to the relatively high bond strengths they create. However, other characteristics of these adhesives provide various manufacturing challenges. For instance, PUR's react with atmosphere and must therefore be melted in a closed container. Accordingly, typical adhesive supply systems associated with PUR's include a closed melter unit that supplies heated adhesive to a gear pump. The adhesive is then supplied to a dispensing head through a heated hose to maintain the required temperature.

When PUR's are used in applications requiring relatively small quantities of adhesive per unit, such as the sealing of battery packs for personal computers, the residence time of the adhesive within the heated hose can exceed the "pot life" of the adhesive. The "pot life" is the maximum time at operating temperature before the adhesive starts to degrade, such as by charring and becoming more viscous. Exceeding the pot life of an adhesive can cause adhesive performance problems and increased maintenance.

It would be desirable to provide a dispensing system which does not require a large supply of adhesive to be maintained, and which is especially suited to the use of reactive hot melt adhesives. In addition, it would be desirable to provide a dispensing system as described above and which requires a minimum amount of space.

SUMMARY

In one embodiment an apparatus is provided for dispensing a liquid. The apparatus includes a valveless cartridge assembly having a housing with proximal and distal ends, an opening at the proximal end, and an outlet port for dispensing the liquid at the distal end. The opening is configured to accept a cartridge of the liquid therethrough and communicating with an interior space of the housing. A metered dispensing device is coupled to the valveless cartridge assembly and includes a positive displacement pump that is in fluid communication with the interior space and the outlet port for selectively dispensing the liquid through the outlet port. In a specific embodiment, at least a portion of the metered dispensing device is disposed within the housing. In alternative embodiments, at least a portion of the metered dispensing device is coupled to an exterior of the housing.

The positive displacement pump may, for example, be a gear pump. The apparatus may include a heating element for heating the housing sufficiently to maintain the liquid in the cartridge in a molten state. The housing and the outlet port may be, in specific embodiments, disposed generally along a common axis. The apparatus may include, additionally or alternatively, a cap that is engageable with an opened end of the cartridge, and a clamp that is engageable with the cap for securing the cartridge relative to the housing. A piercing element may be operable to penetrate through the cap and be configured to direct pressurized air from an external source into an interior of the cartridge. A nozzle may be coupled to the distal end of the housing for controlling dispensing of the liquid to an exterior. The nozzle may include a tube that fluidly communicates the outlet port of the housing with the exterior. The nozzle, in specific embodiments, may be heated with a heating element of the apparatus. In specific embodiments, the apparatus may include a motor operatively coupled to a driven gear of the positive displacement pump that is meshed with an idler gear to control rotation of the driven gear of the pump. In embodiments having a motor, the motor could, for example, be a reversible servo motor. Moreover, in certain embodiments, the motor may be part of a robot operatively coupled to the driven gear.

In another embodiment, an apparatus is provided for dispensing a liquid. A cartridge assembly has a housing with proximal and distal ends, an opening at the proximal end, and an outlet port for dispensing the liquid at the distal end. The opening is configured to accept a cartridge of the liquid therethrough and communicates with an interior space of the housing. A metered dispensing device is coupled to the cartridge assembly and includes a positive displacement pump that is disposed within the housing and which is in fluid communication with the interior space and the outlet port for selectively dispensing that liquid through the outlet port. The housing and the outlet port are disposed generally along a common axis. The positive displacement pump may be fluidly coupled to the interior space of the housing and to the outlet port respectively via first and second conduits that are disposed generally along the common axis.

In yet another embodiment, a method is provided for dispensing liquid from a cartridge. The cartridge is received within a housing of a valveless cartridge assembly and the liquid is forced from the cartridge through a metered dispensing device that includes a positive displacement pump and which is coupled to the valveless cartridge assembly. The metered dispensing device is activated to thereby dispense the liquid from the housing. The method may include heating the housing to transfer heat to the cartridge that is sufficient to maintain the liquid therein in a molten state. The method may include dispensing the liquid generally along a common axis of the housing and an outlet port thereof. The method may, additionally or alternatively, include piercing a cured layer of the liquid in the cartridge with a piercing element that is fluidly connected to an external source of pressurized air to thereby pressurize the liquid.

BRIEF DESCRIPTION OF THE DRAWINGS

The accompanying drawings, which are incorporated in and constitute a part of this specification, illustrate an embodiment of the invention and, together with a general description of the invention given above, and the detailed description of the embodiment given below, serve to explain the principles of the invention.

DETAILED DESCRIPTION OF THE DRAWINGS

Figure 1:
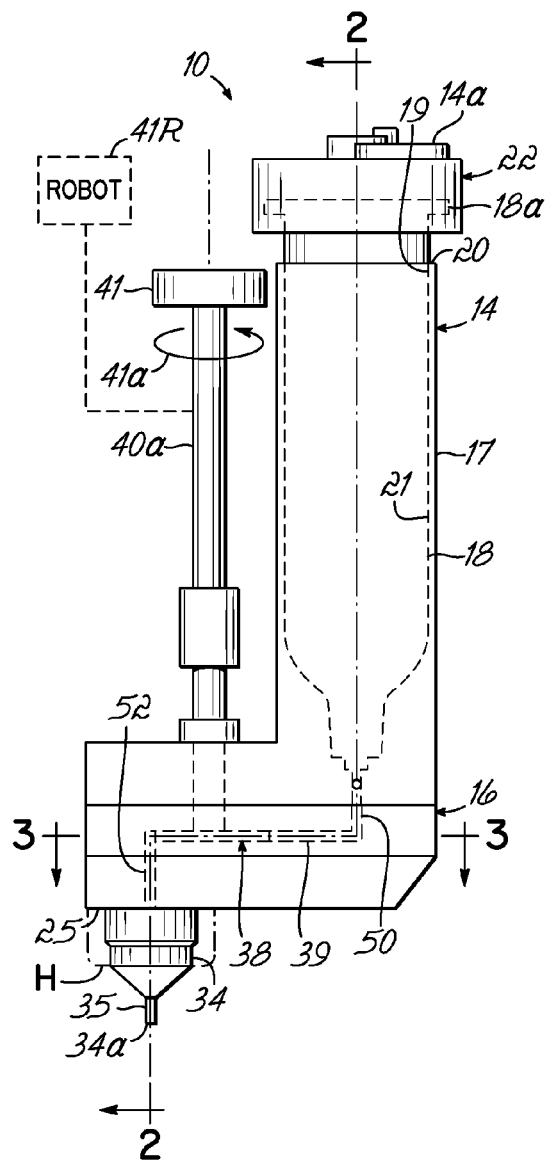
FIG. 1 is a side view of a dispensing apparatus constructed in accordance embodiment of the invention.
Figure 2:
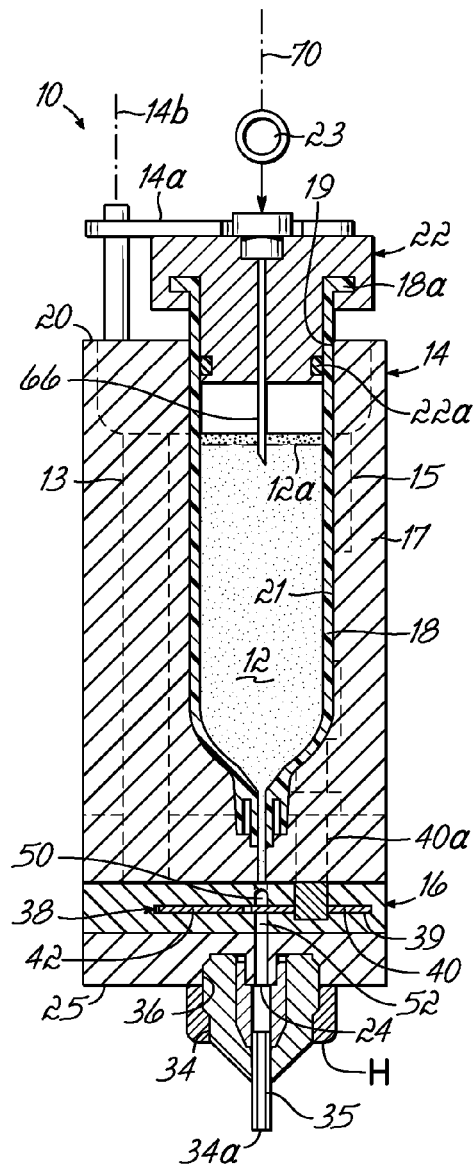
FIG. 2 is a cross-sectional front taken generally along line 2-2 of FIG. 1.
Figure 3:
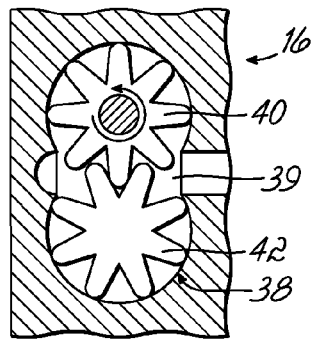
FIG. 3 is a schematic of a cross-sectional view taken generally along line 3-3 of FIG. 1.

Referring first to FIGS. 1, 2, and 3, an apparatus 10 constructed in accordance with an embodiment of the invention is provided for dispensing a liquid 12. The apparatus 10 generally includes a valveless cartridge assembly 14 and a metered dispensing device 16 that is coupled to the cartridge assembly 14 for selectively dispensing the liquid 12, for example and without limitation, a reactive hot melt adhesive such as one containing a polyurethane resin ("PUR"), two component polymeric materials ("2 k materials") or others including any ambient temperature or hot melt materials known to exhibit a change in viscosity over the expected life of a cartridge containing the same. By "valveless", Applicant refers to a cartridge assembly that does not include a valve at a dispensing port thereof to control the flow of liquid out of the assembly. In this regard, the term "valveless" is not intended to exclude cartridge assemblies that may include one or more valves carrying out functions different from that of dispensing the liquid out of the assembly.

The cartridge assembly 14 includes a cartridge jacket or housing 17 that can be in the form of a heated cylinder or other forms and which is configured to receive a disposable cartridge 18 containing the liquid 12 therein. At room temperature, the liquid may be a solid material, such as an adhesive in solid form. In this regard, the housing 17 may be heated such that heat transfer from the housing 17 to the cartridge 18 changes or at least maintains the solid material in a molten state. The cartridge 18 may or may not be heated prior to insertion into housing 17, or it may, if heated, already be in a molten state or condition when cartridge 18 is inserted into housing 17. To facilitate heating of housing 17, cartridge assembly 14 may include one or more heating elements such as heating cartridges 13 (only one shown) and one or more temperature measuring devices such as resistive temperature detectors 15 ("RTD", only one shown) that permits control (e.g., measurement and adjustment) of the heat supplied to housing 17 in ways known in the art.

Cartridge 18 is inserted through an opening 19 at a proximal end 20 of the housing 17 and is received into an interior space 21 thereof that has a shape that is complimentary to the shape of cartridge 18 such that cartridge 18 fits closely within housing 17. A cap 22 permits coupling of cartridge 18 relative to the housing 17 to thereby facilitate containment of the cartridge 18 therein. In particular, the cap 22 is inserted into an interior portion of the cartridge 18 and secured relative to the cartridge 18, for example, through a ¼ turn of the cap 22 that engages the same against an underside of a generally oval-shaped flange 18a of cartridge 18. A seal member such as an O-ring 22a is positioned between the cap 22 and the interior of cartridge 18 to thereby define a pressure-tight seal between cap 22 and the interior. Once the cap 22 is coupled with cartridge 18, the cartridge 18 is inserted into the interior space 21 of housing 17 and secured relative thereto via a pivotally mounted clamp 14a of the assembly 14. More specifically, in this embodiment, the clamp 14a is pivotally mounted about a pivot axis 14b at the top end of the assembly 14 and is swung into position to engage the cap 22, thereby securing cartridge 18 within the interior space 21 of the housing 17 during dispensing of liquid 12. Moreover, in this exemplary embodiment, a spring-biased detente pin (not shown) locks the clamp 14a in position so as to prevent decoupling pivotal movement of clamp 14a during use.

The cartridge 18 receives, through cap 22, pressurized air from a suitable external source 23 for purposes to be described below, and the housing 17 includes an outlet port 24 at its distal end 25 for dispensing the liquid 12 from the housing 17. Liquid 12 leaves the housing 17 through outlet port 24 and may be applied onto a target (not shown) through a nozzle 34 that may be coupled, for example, via threads 36, to the distal end 25 of the housing 17 and which controls aspects of the dispensing of liquid 12. The threads 36 may be chosen, for example, to respectively facilitate convenient coupling and decoupling of the nozzle 34 respectively onto and from housing 17. For example, and without limitation, threads 36 may be chosen such that only a ¼ turn is required to couple or decouple nozzle 34 respectively onto and from housing 17.

Nozzle 34 may control different aspects of the dispensing of liquid 12. For example and without limitation, nozzle 34 may be adapted to control the thickness and/or direction of the liquid 12 that is dispensed to an exterior of the cartridge assembly 14. Moreover, nozzle 34 may be heated, for example with an optional heater H, to facilitate maintaining the liquid 12 in a molten state as it exits the cartridge assembly 14 altogether. In this regard, the nozzle 34 may receive heat exclusively from heater H, through conduction from heated housing 17, or be heated by both sources. Nozzle 34 includes an outlet tip 34a that is in fluid communication with outlet port 24 of the housing 17 via a thin-walled hollow tube 35 that may determine, for example, the thickness of the resulting filament of liquid 12 that is dispensed from cartridge assembly 14.

For purposes of dispensing precise amounts of the liquid 12 from cartridge assembly 14, the metered dispensing assembly 16 is coupled to the cartridge assembly 14 in ways to be described below. In the illustrative embodiment of FIG. 1-2, at least a portion of metered dispensing assembly 16 is disposed within the housing 17. In particular, a positive displacement pump 38 of the metered dispensing assembly 16 is disposed within a pump conduit 39 located in housing 17 although it is contemplated that other portions thereof may alternatively or additionally be disposed within housing 17. While the embodiment of FIGS. 1-2 includes a positive displacement pump 38, as described herein, it is contemplated that other types of pumps may alternatively or additionally form part of metered dispensing device 16. For example, and without limitation, metered dispensing device 16 may include a piston pump, a progressive cavity pump, a metered rod pump, a gerotor pump and/or a peristaltic pump. The positive displacement pump 38 of the illustrative embodiment of FIGS. 1-3 permits dispensing of a desired amount of the liquid 12 independent of any change in viscosity undergone by liquid 12, for example, while stored in cartridge 18 prior to use.

With continued reference to FIGS. 1-2 and further referring to FIG. 3, positive displacement pump 38 includes a driven gear 40 and a follower or idler gear 42 that cooperates with driven gear 40 to feed precise amounts of liquid 12 toward outlet port 24. Actuation and rotation of a motor 41 such as, and without limitation, a reversible servo motor, for example in the general direction of arrow 41a (or alternatively rotation of a rotating component of a schematically depicted robot 41R or other device of the apparatus 10) causes selective dispensing of the liquid 12. More specifically, motor 41 is coupled to the driven gear 40 through a transmission rod 40a in ways known in the art such that rotation thereof causes rotation of gears 40 and 42 to meter the liquid 12. More specifically, positive displacement pump 38 fluidly communicates with the interior space 21 of the housing 17 via a first conduit 50, which extends between the interior space 21 and the pump conduit 39 as shown FIG. 1, to receive liquid 12 from the cartridge 18. A second conduit 52, which extends between the pump conduit 39 and the outlet port 24 as shown in FIG. 1, fluidly communicates the positive displacement pump 38 with the outlet port 24 for feeding liquid 12 toward the outlet port 24.

The interior of cartridge 18 is pressurized to facilitate dispensing of the liquid 12 toward metered dispensing device 16, which in turn forces liquid 12 into first conduit 50. More specifically, a hollow piercing element 66 of the assembly 14 extends into the interior of cartridge 18 and is connectable to the external source 23 of air from which it receives air having a pressure, for example, between about 5 and about 10 psi. Piercing element 66 is configured to penetrate a cured upper layer 12a of the liquid 12 that may form within cartridge 18 to thereby reach a main volume of the liquid 12. Those of ordinary skill in the art will readily appreciate that this is merely illustrative as the assembly 14 may instead include a piercing element having a shape, orientation, and/or location different from those shown, or include no piercing element 66 at all.

In the illustrative embodiment of FIGS. 1-3, the housing 17, or at least the interior space 21 thereof, extends along an axis 70 that is generally shared with the conduit 50 of the metered dispensing device 16 (and is generally parallel to pivot axis 14b as shown in FIG. 1). In this regard, the first and second conduits 50, 52 lie respectively along axes that are different from one another. Moreover, as shown in FIG. 1, the pump conduit 39 is oriented transverse to the first and second conduits 50, 52 along an entire length if the pump conduit 39. It is generally contemplated that one or more of housing 17, outlet port 24 or the first and second conduits 50, 52 may extend along respective axes that may or may not coincide with axes of the other elements. For example, an apparatus may be such that the housing 17 and the outlet port 24 share a common axis while one or more of the first and second conduits 50, 52 extend along a different axis (axes). Configurations where two or more of the housing 17, outlet port 24 or the first and second conduits 50, 52 share a common axis may be desirable, for example, in order to minimize the trajectory or path followed by the liquid 12 from the cartridge 18 and toward an exterior of the cartridge assembly 14.

Figure 4:
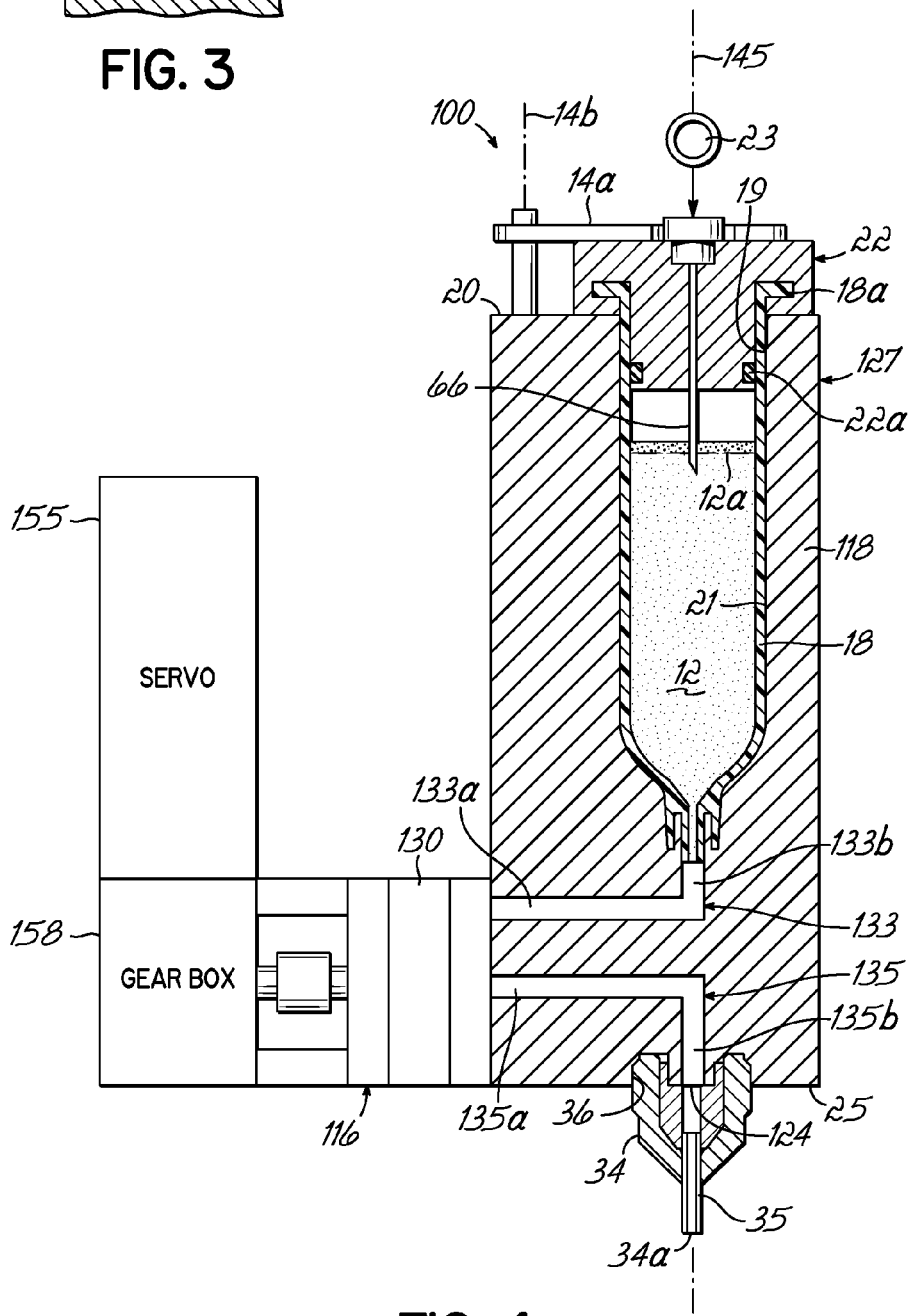
FIG. 4 is a cross-sectional front view illustrating a dispensing apparatus constructed in accordance with another embodiment of the invention.

With reference to FIG. 4, an alternative embodiment of an apparatus 100 is also provided for dispensing a liquid such as a hot melt adhesive. To facilitate the description of apparatus 100, similar reference numerals in FIG. 4 refer to similar features of FIGS. 1-3, which may be referred to for an understanding of the features and/or functional aspects of apparatus 100 as well. Apparatus 100 includes a metered dispensing device 116 coupled to an exterior wall 118 of a housing 127 and performs a function similar to that performed by metered dispensing device 16 of apparatus 10 (FIG. 1-3). In this regard, metered dispensing device 116 includes a positive displacement pump 130, similar to positive displacement pump 38 (FIGS. 1-3), that fluidly communicates with an interior space 21 of housing 127 via first and second conduit portions 133a, 133b of an inlet conduit 133 to receive liquid 12 from cartridge 18.

An outlet conduit 135 having first and second portions 135a, 135b fluidly communicates the positive displacement pump 130 with an outlet port 124 of housing 127 to dispense liquid 12 from apparatus 100 to an exterior thereof. To accommodate the coupling and orientation of the metered dispensing device 116 relative to the housing 127, the first portions 133a, 135a of the inlet and outlet conduits 133, 135 are oriented in directions generally transverse to an axis 145 of the housing 127. Respective second portions 133b, 135b of the inlet and outlet conduits 133, 135 are oriented transversely to the first portions 133a, 135a and along the axis 145 of housing 127. Positive displacement pump 130 of metered dispensing device 116 is, in this exemplary embodiment, energized by a servo motor 155 or other device or component capable of imparting rotational motion to a gear box 158 (or other component) coupled to the positive displacement pump 130 in ways known in the art. In one aspect of this illustrative embodiment, the outlet port 124 extends along axis 145 and therefore shares a common axis with housing 127 and, more particularly, with the interior space 21 thereof, as well as with the second portions 133b, 135b of the inlet and outlet conduits 133, 135.

Figure 5:
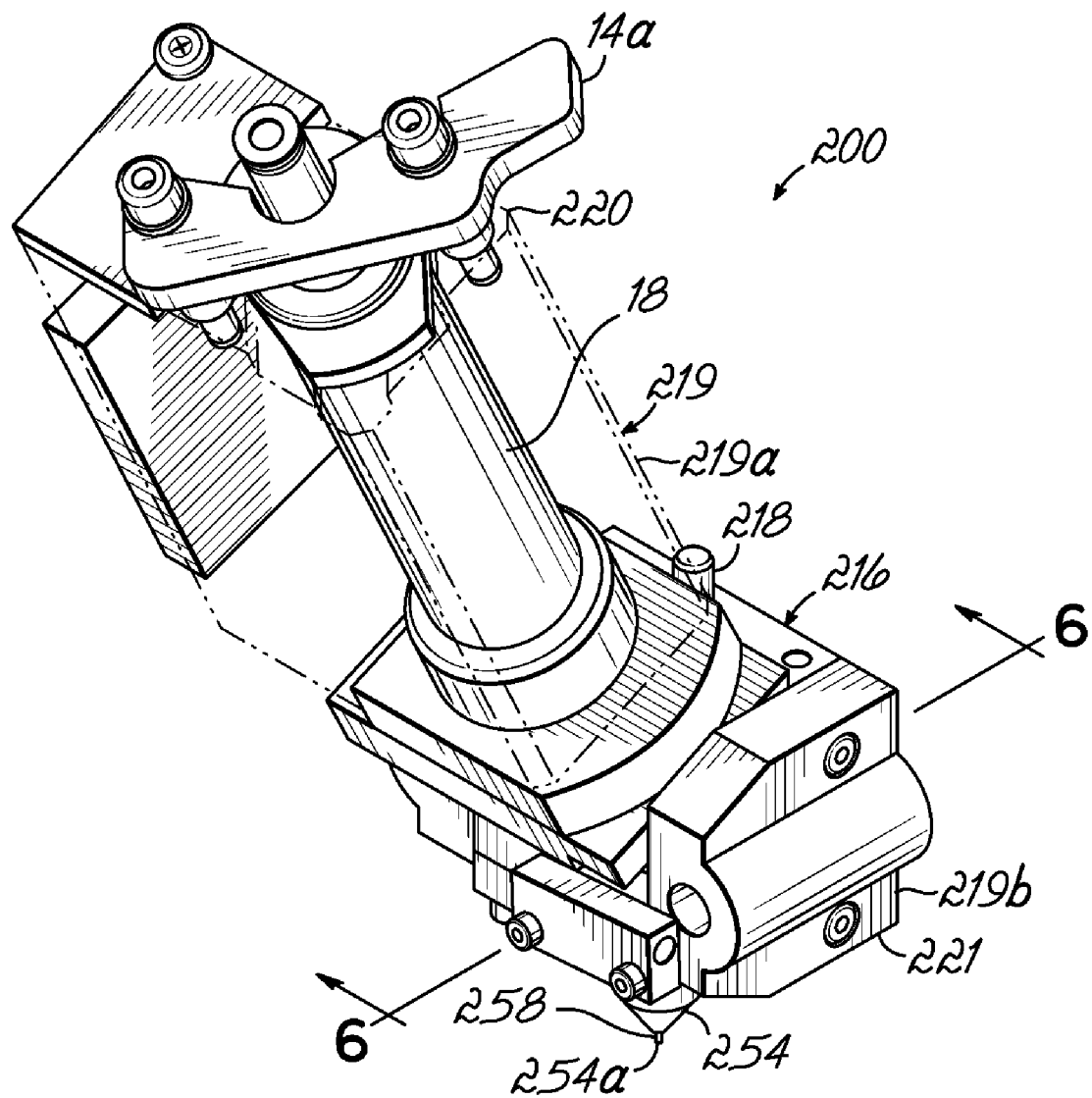
FIG. 5 is a perspective view of illustrating a dispensing apparatus constructed in accordance with yet another embodiment of the invention.
Figure 6:
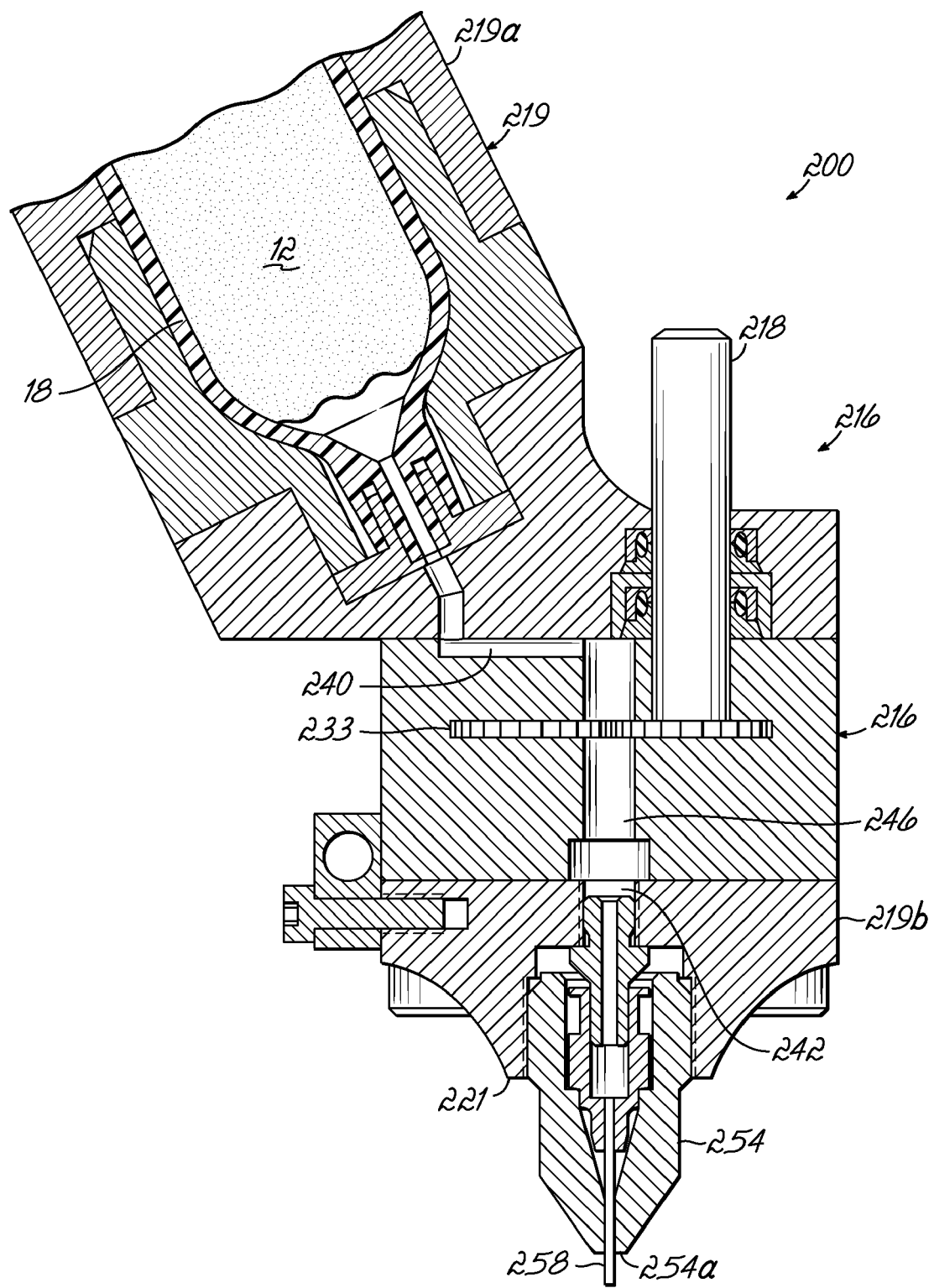
FIG. 6 is a cross-sectional view taken generally along line 6-6 of FIG. 5.

With reference to FIGS. 5-6, an alternative embodiment of an apparatus 200 is also provided for dispensing a liquid such as a reactive hot melt adhesive or any other liquid as described above. To facilitate the description of apparatus 200, similar reference numerals in FIGS. 5-6 refer to similar features of FIGS. 1-4, which may be referred to for an understanding of the features and/or functional aspects of apparatus 200 as well. Portions of the structure of apparatus 200 are similar to those described with reference to one or more embodiments disclosed in U.S. application Ser. No. 12/367,609, filed Feb. 9, 2009, assigned to Nordson Corporation of Westlake, Ohio, the assignee of the present Application, and the contents of which are incorporated herein, in its entirety, by reference.

Apparatus 200 includes a metered dispensing device 216 disposed in and coupled to a housing 219 between proximal and distal ends 220, 221 thereof. In this embodiment, housing 219 includes a first portion 219a and a second portion 219b that is generally transverse to the first portion 219a, although other relative orientations of the first and second portions 219a, 219b are alternatively contemplated and still fall within the scope of the present disclosure. Metered dispensing device 216 includes a transmission rod 218 coupled to an illustrative positive displacement pump 233 to energize the pump 233 and thereby selectively meter controlled amounts of the liquid 12. Transmission rod 218 is operatively coupled to a motor (not shown) or similar component in ways known in the art. The positive displacement pump 233 is in fluid communication, via a suitably oriented first conduit 240, with the cartridge 18 to thereby receive liquid 12 therefrom. A second conduit 246 fluidly communicates positive displacement pump 233 with an outlet port 242 of housing 219. In operation, second conduit 246 receives controlled amounts of the liquid 12 from positive displacement pump 233 and in turn supplies it to a nozzle 254 that is coupled to housing 219 adjacent the outlet port 242. Nozzle 254 includes an outlet tip 254a that is in fluid communication with outlet port 242 of the housing 219 via a needle 258 that may determine, for example, the thickness of the resulting filament of liquid 12 that is dispensed from apparatus 200.

Referring again to FIGS. 1-6, any of the apparatus 10, 100, 200 may be configured to respond to an analog signal from a speed sensing device (not shown) that is proportional to the speed of any robot (e.g., robot 41R of FIG. 2) that may be carrying the apparatus. This analog signal may, for example, be supplied to a microprocessor (not shown) that is electrically coupled to the respective motor(s). Additional control features include the ability to program an end-of-cycle adhesive flow reversal, using the microprocessor, by reversing the direction and/or speed of the motor and/or those of the positive displacement pump 38, 130, 233. Reversing the direction and/or speed of the motor and/or pump 38, 130, 233 at the end of each cycle may also assist in maintaining close control over portions of liquid 12 that may remain in the passages or conduits between applications.

While the present invention has been illustrated by a description of various embodiments and while these embodiments have been described in considerable detail, it is not intended to restrict or in any way limit the scope of the appended claims to such detail. Additional advantages and modifications will readily appear to those skilled in the art. The invention in its broader aspects is therefore not limited to the specific details, representative apparatus and method, and illustrative example shown and described. Accordingly, departures may be made from such details without departing from the spirit or scope of the general inventive concept.

What is claimed is:

1. An apparatus for dispensing an adhesive contained within a cartridge, comprising:
    a valveless cartridge assembly including a housing with proximal and distal ends, an opening at said proximal end, and an outlet port for dispensing the adhesive at said distal end, said opening sized to receive the cartridge containing the adhesive therethrough and communicating with an interior space of said housing, said housing also including a first conduit extending distally from said interior space, a second conduit extending proximally to said outlet port, and a pump conduit directly coupled to and extending between said first and second conduits, said pump conduit being oriented transverse to said first and second conduits along an entire length of said pump conduit,
    a heating element for heating said housing sufficiently to maintain the adhesive in the cartridge in a molten state, and
    a metered dispensing device coupled to said valveless cartridge assembly and including a positive displacement pump located within said pump conduit in said housing and in fluid communication with said interior space and said outlet port for selectively dispensing the molten adhesive through said outlet port, said metered dispensing device also including a transmission rod for driving said positive displacement pump, said transmission rod extending out of said housing from said positive displacement pump,
    wherein said housing defines a central longitudinal axis at said opening, said first conduit, and said interior space, said second conduit is oriented generally parallel to said central longitudinal axis, and said transmission rod is oriented generally parallel to said central longitudinal axis of said housing.

2. The apparatus of claim 1, wherein said positive displacement pump is a gear pump.

3. The apparatus of claim 1, wherein the cartridge includes an open end and the apparatus further comprises:
    a cap configured to cover the open end of the cartridge by being inserted at least partially into said interior space through said opening; and
    a clamp engageable with said cap for securing the cartridge relative to said housing, said clamp being pivotally mounted for rotation about a pivot axis oriented generally parallel to the central longitudinal axis.

4. The apparatus of claim 3, further comprising:
    a piercing element operable to penetrate through said cap and configured to direct pressurized air from an external source into an interior of the cartridge to pressurize the adhesive and push the adhesive to the positive displacement pump.

5. The apparatus of claim 1, further comprising:
    a nozzle coupled to said distal end of said housing for controlling dispensing of the adhesive to an exterior.

6. The apparatus of claim 5, wherein said nozzle includes a tube fluidly communicating said outlet port of said housing with the exterior.

7. The apparatus of claim 5, further comprising a heater operatively coupled to said nozzle.

8. The apparatus of claim 1, wherein said positive displacement pump includes a driven gear and an idler gear meshed with said driven gear, the apparatus further comprising:
    a robot including a motor operatively coupled to said driven gear of said positive displacement pump for controlling rotation of said driven gear.

9. The apparatus of claim 1, wherein said positive displacement pump includes a driven gear and an idler gear meshed with said driven gear, the apparatus further comprising:
    a motor operatively coupled to said driven gear of said positive displacement pump for controlling rotation of said driven gear.

10. The apparatus of claim 9, wherein said motor is a reversible servo motor.

11. The apparatus of claim 1, further comprising:
    the cartridge of the adhesive.

12. An apparatus for dispensing an adhesive, comprising:
    a cartridge assembly having a housing with an exterior defining opposing proximal and distal ends, an opening through said proximal end, and an outlet port for dispensing the adhesive through said distal end, said opening configured to accept a cartridge of the adhesive therethrough and communicating with an interior space of said housing;
    a heating element for heating said housing sufficiently to maintain the adhesive in the cartridge in a molten state;
    a metered dispensing device coupled to said exterior of said cartridge assembly and including a positive displacement pump in fluid communication with said interior space and said outlet port for selectively dispensing the adhesive through said outlet port, said positive displacement pump being located outside said housing;
    an inlet conduit located within said housing and communicating between said interior space and said positive displacement pump; and
    an outlet conduit located within said housing and communicating between said positive displacement pump and said outlet port,
    wherein said interior space of said housing, at least a portion of each of said inlet and outlet conduits, said opening, and said outlet port are each centered at a common central longitudinal axis.

13. The apparatus of claim 12, further comprising:
    the cartridge of the adhesive, wherein said cartridge is centered along said central longitudinal axis when said cartridge is inserted into said housing.

14. The apparatus of claim 12, wherein said inlet conduit includes a first portion extending to said exterior to communicate with said positive displacement pump and a second portion oriented transverse to said first portion and communicating between said interior space of said housing and said first portion,
    wherein said outlet conduit includes a first portion extending from said exterior to communicate with said positive displacement pump and a second portion oriented transverse to said first portion and communicating between said outlet port of said housing and said first portion, and wherein said second portions of each of said inlet and outlet conduits are centered at said common central longitudinal axis.

15. A method of dispensing adhesive from a cartridge containing adhesive, the method comprising:

receiving the cartridge containing adhesive through an opening and into an interior space of a housing of a valveless cartridge assembly, the housing including the opening, the interior space, an outlet port, a first conduit extending distally from the interior space, a second conduit extending proximally to the outlet port, and a pump conduit directly coupled to and extending between the first and second conduits, the housing defining a central longitudinal axis at the interior space;

forcing the adhesive from the cartridge through a metered dispensing device including a positive displacement pump located within the pump conduit of the housing of the valveless cartridge assembly;

heating the housing to transfer heat to the cartridge sufficient to maintain the adhesive therein in a molten state; and driving the positive displacement pump with a transmission rod oriented generally parallel to the central longitudinal axis of the housing, thereby activating the metered dispensing device to dispense the adhesive from the housing by moving adhesive from the interior space through the first conduit, the pump conduit, and the second conduit and to the outlet port, wherein the opening, the first conduit, and the interior space are centered at the central longitudinal axis, the second conduit is oriented generally parallel to the central longitudinal axis, and the pump conduit is oriented generally transverse to the central longitudinal axis along an entire length of said pump conduit.

16. The method of claim 15, wherein the outlet port is oriented parallel to the central longitudinal axis of the housing and the transmission rod.

17. The method of claim 15, further comprising:

piercing a cured layer of the adhesive in the cartridge with a piercing element fluidly connected to an external source of pressurized air; and pressurizing the adhesive with the pressurized air to push the adhesive to the positive displacement pump.

18. An apparatus for dispensing an adhesive contained within a cartridge having an open end, comprising:

a valveless cartridge assembly including a housing with proximal and distal ends, an opening at said proximal end, and an outlet port for dispensing the adhesive at said distal end, said opening sized to receive the cartridge containing the adhesive therethrough and communicating with an interior space of said housing, a heating element for heating said housing sufficiently to maintain the adhesive in the cartridge in a molten state, a cap configured to cover the open end of the cartridge by being inserted at least partially into said interior space through said opening, a clamp engaged with said cap to secure the cartridge relative to said housing, the clamp being pivotally mounted on said housing, and a metered dispensing device coupled to said valveless cartridge assembly and including a positive displacement pump located within said housing and in fluid communication with said interior space and said outlet port for selectively dispensing the molten adhesive through said outlet port, said metered dispensing device also including a transmission rod for driving said positive displacement pump, said transmission rod extending out of said housing from said positive displacement pump, wherein said housing defines a central longitudinal axis at said opening and said interior space, said transmission rod is oriented generally parallel to said central longitudinal axis of said housing, and said clamp rotates about a pivot axis oriented generally parallel to said central longitudinal axis between a blocking position over said cap and a non-blocking position rotated away from said cap.

* * * * *